US012784255B2

(12) United States Patent
Garcia

(10) Patent No.: US 12,784,255 B2
(45) Date of Patent: Nov. 3, 2026

(54) METHOD FOR DETERMINING THE RELATIVE ORIENTATION OF TWO VEHICLES

(71) Applicant: Continental Automotive Technologies GmbH, Hannover (DE)

(72) Inventor: Lucien Garcia, Tournefeuille (FR)

(73) Assignee: Continental Automotive Technologies GmbH, Hannover (DE)

( * ) Notice: Subject to any disclaimer, the term of this patent is extended or adjusted under 35 U.S.C. 154(b) by 250 days.

(21) Appl. No.: 18/707,923

(22) PCT Filed: Nov. 16, 2022

(86) PCT No.: PCT/EP2022/082068
§ 371 (c)(1),
(2) Date: May 7, 2024

(87) PCT Pub. No.: WO2023/088932
PCT Pub. Date: May 25, 2023

(65) Prior Publication Data
US 2026/0162293 A1 Jun. 11, 2026

(30) Foreign Application Priority Data
Nov. 18, 2021 (FR) ...................................... 2112204

(51) Int. Cl.
*G06T 7/70* (2017.01)

(52) U.S. Cl.
CPC ...... *G06T 7/70* (2017.01); *G06T 2207/30244* (2013.01); *G06T 2207/30261* (2013.01)

(58) Field of Classification Search
CPC .......... G06V 20/58; G06V 20/56; G06T 7/00; G06T 7/70; G06T 2207/30244;
(Continued)

(56) References Cited

U.S. PATENT DOCUMENTS

2008/0125972 A1* 5/2008 Neff ...................... B60W 40/02 701/300
2011/0316980 A1 12/2011 Dubbelman et al.
(Continued)

FOREIGN PATENT DOCUMENTS

EP 2380136 A1 10/2011

OTHER PUBLICATIONS

De Ponte Müller et al., Survey on Ranging Sensors and Cooperative Techniques for Relative Positioning of Vehicles, Sensors 2017, 17, 271, pp. 1-27, doi:10.3390/s17020271.*
(Continued)

*Primary Examiner* — Guillermo M Rivera-Martinez
(74) *Attorney, Agent, or Firm* — Buchanan Ingersoll & Rooney PC

(57) ABSTRACT

A method for determining the orientation of a vehicle with respect to a reference object, each having an image sensor, is described. The method includes: receiving an image acquired by each image sensor of the vehicle, in which the vehicle/reference object is visible; receiving information on the position of each image sensor with respect to the reference object/vehicle on which it is installed; based on the received information, estimating a first position of each image sensor in the image acquired by the other image sensor; determining the relative orientation between the two image sensors; and deducing, based on the relative orientation between the two image sensors, the relative orientation between the vehicle and the reference object.

9 Claims, 5 Drawing Sheets

(58) Field of Classification Search
CPC . G06T 2207/30248; G06T 2207/30252; G06T 2207/30261; G06T 1/00
See application file for complete search history.

(56) References Cited

U.S. PATENT DOCUMENTS

| | | | | |
|---|---|---|---|---|
| 2018/0300899 | A1* | 10/2018 | Dreuw | H04N 17/002 |
| 2019/0049958 | A1* | 2/2019 | Liu | G01S 13/867 |
| 2020/0327343 | A1* | 10/2020 | Lund | G06T 7/50 |
| 2020/0408534 | A1* | 12/2020 | Fowe | G01C 21/32 |

OTHER PUBLICATIONS

FR Search Report issued in corresponding Patent Application No. FR 2112204 dated Jun. 30, 2022, 9 pages.
International Search Report (PCT/ISA/210) with English translation and Written Opinion (PCT/ISA/237) mailed on Mar. 9, 2023, by the European Patent Office as the International Searching Authority for International Application No. PCT/EP2022/082068, 14 pages.
Janai et al., “Computer Vision for Autonomous Vehicles: Problems, Datasets and State-of-the-Art”, ISPRS Journal of Photogrammetry and Remote Sensing, Apr. 20, 2017, 67 pages.
Williams, “Multi-robot Collaborative Visual Navigation with Micro Aerial Vehicles”, University of Liverpool, Apr. 2017, 188 pages.

* cited by examiner

METHOD FOR DETERMINING THE RELATIVE ORIENTATION OF TWO VEHICLES

CROSS REFERENCE TO RELATED APPLICATIONS

This application is the U.S. National Phase Application of PCT International Application No. PCT/EP2022/082068, filed Nov. 16, 2022, which claims priority to French Patent Application No. 2112204, filed Nov. 18, 2021, the contents of such applications being incorporated by reference herein.

DESCRIPTION

Field of the Invention

The present disclosure relates to a method for determining the relative orientation of two vehicles which are equipped with cameras. It has advantageous applications in driver assistance functionalities such as predicting or estimating the trajectory of third-party vehicles, collision detection, or grouping vehicles by platoons or convoys.

Background of the Invention

Much work is currently being done in order to make vehicles autonomous, which implies detecting the positions of the vehicles surrounding a vehicle under consideration, detecting and predicting the trajectory of these vehicles, and therefore determining the position and orientation of the surrounding vehicles.

For this purpose, it is possible to use a lidar sensor, which makes it possible to obtain three-dimensional information on the surroundings of the vehicle. However, lidar sensors are expensive, consume a lot of energy and are also fairly large, which makes them difficult to integrate into a small vehicle. Consequently, not all vehicles are equipped with lidar sensors.

For vehicles without lidar sensors but equipped with a camera, determining the orientation of a surrounding vehicle is more difficult in the absence of three-dimensional information. This estimate is made, based on the detected position of the surrounding vehicle and on an assumption about the size of the vehicle. However, the estimate obtained is not accurate and may cause errors in subsequent processing.

It is also possible to estimate an orientation of a surrounding vehicle based on a bottom edge of the object, which is obtained by determining a window encompassing the entire outline of the vehicle in the image, and by identifying a bottom point of this window. Estimates made on this basis are not more accurate, notably when the road is not horizontal.

SUMMARY OF THE INVENTION

The present disclosure is intended to improve the situation.

In particular, one aspect of the invention is a method for determining the orientation of a vehicle with respect to another object, for example a second vehicle, which is more accurate than the solutions of the prior art. Another aspect of the invention is applicable to vehicles without lidar sensors, but equipped with cameras.

In this regard, a method for determining the orientation of a vehicle with respect to a reference object is proposed, the vehicle and the reference object each comprising an image sensor, the method being implemented by a computer and comprising:

- receiving an image acquired by the image sensor of the vehicle, in which the reference object is visible, and an image acquired by the image sensor of the reference object, in which the vehicle is visible,
- receiving information on the position of the image sensor of the reference object with respect to the latter and information on the position of the image sensor of the vehicle with respect to the latter,
- based on the received information, estimating a first position of the image sensor of the reference object in the image acquired by the image sensor of the vehicle, and a first position of the image sensor of the vehicle in the image acquired by the image sensor of the reference object,
- determining the relative orientation between the two image sensors so that:
  - a second position of the image sensor of the reference object in the image acquired by the image sensor of the vehicle computed based on said relative orientation corresponds to the estimated first position of the image sensor of the reference object, and
  - a second position of the image sensor of the vehicle in the image acquired by the image sensor of the reference object computed based on said relative orientation corresponds to the estimated first position of the image sensor of the vehicle,
- deducing, based on the relative orientation between the two image sensors, the relative orientation between the vehicle and the reference object.

In some embodiments, the reference object is a pedestrian, another vehicle, or an infrastructure element.

In some embodiments, the method is implemented by a computer on board the vehicle, in the reference object, or by a remote computer.

In some embodiments, the reference object is a second vehicle, the method is implemented by a computer on board the first and/or the second vehicle, and comprises a preliminary step of establishing a communication link between the first vehicle and the second vehicle.

In some embodiments, the relative orientation between the two image sensors is determined by minimizing the difference between the estimated first position and the computed second position of the same image sensor.

In some embodiments, the relative orientation between the two image sensors is determined by the Levenberg-Marquardt algorithm.

In some embodiments, determining the relative orientation between the image sensors comprises determining the relative yaw and pitch between the image sensors, the roll being assumed to be zero.

According to another object, a computer program product is described comprising instructions for implementing the method according to the preceding description when it is executed by a processor.

According to another object, a non-transient computer-readable storage medium is described on which is stored a program for implementing the method according to the preceding description when this program is executed by a processor.

According to another object, a vehicle comprising an image sensor, a computer, and an interface for connecting to a telecommunications network is described, characterized in that the computer is configured to implement the method according to the preceding description.

The proposed method makes it possible to determine the relative orientation between a vehicle equipped with an image sensor, for example a camera, and a reference object, based on an image acquired by the vehicle and the position, with respect to the reference object, of an image sensor installed on the latter. In particular, this method is applicable to determining the relative orientation between two vehicles which are both equipped with cameras. This method makes it possible to compute the relative yaw and pitch between the two vehicles, including when the road is not level. It can be implemented in the absence of lidar sensors on the vehicles.

BRIEF DESCRIPTION OF THE DRAWINGS

Further features, details and advantages will become apparent from reading the following detailed description and from analyzing the appended drawings, in which.

DETAILED DESCRIPTION OF THE EXEMPLARY EMBODIMENTS

Figure 1:
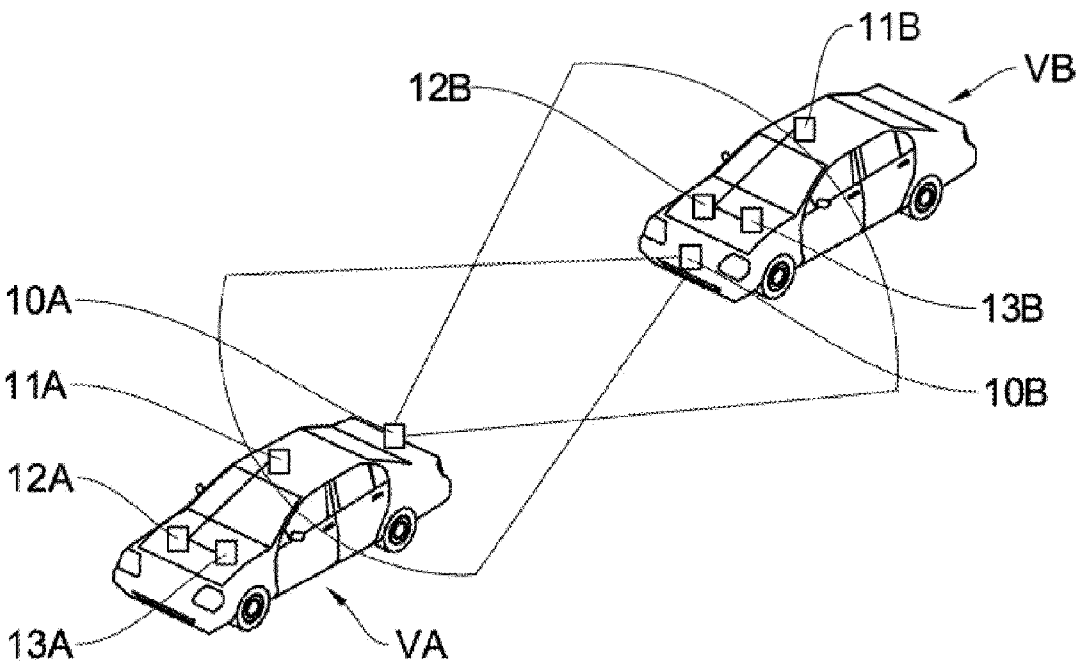
FIG. 1 schematically depicts two vehicles which can implement the method.

With reference to FIG. 1, a method for determining the orientation of a vehicle VA comprising an image sensor 10A with respect to a reference object also comprising an image sensor 10B and which is visible to the image sensor 10A of the vehicle will now be described. Below, what is meant by "image sensor" is a sensor adapted to detect the position of an object; it may be a camera, or else a radar or lidar sensor.

The method will be described below considering one particular embodiment in which the reference object is a second vehicle VB, notably a four-wheeled vehicle of the car or truck type, traveling on the same road as the vehicle VA. Below, the reference numbers which are in accordance with this example and associated with the first vehicle and with the second vehicle comprise an index A or B, respectively. In other embodiments, the reference object may be another type of vehicle, for example a two-wheeled vehicle. It may also be a pedestrian equipped with a camera or with a mobile telephone. It may also be an infrastructure element, for example a toll booth or a gantry.

In the case where the reference object is a second vehicle, the two vehicles may follow one another in the same lane of the road, or travel in different lanes. In some embodiments, each vehicle has an image sensor 10A, 10B which is installed on the respective vehicle with a known position and orientation of the image sensor with respect to the vehicle on which it is installed. The image sensor may be oriented toward the front toward the rear of the vehicle so as to acquire images in which the vehicles preceding or following the vehicle are visible. The image sensor may also be installed on one side of the vehicle. In some embodiments, one or each vehicle VA, VB, may be equipped with several cameras oriented toward the front and/or toward the rear and/or toward the sides of the vehicle.

The vehicle VA and the reference object VB further comprise an interface 11A, 11B for accessing a telecommunications network, for example a GSM, LTE, 3G, 4G or 5G, or Wi-Fi network. In an embodiment illustrated schematically in FIG. 2, in which the reference object is a second vehicle VB, the vehicles may communicate with one another by a vehicle-to-vehicle communication. In this case, the vehicles also comprise a computer 12A, 12B configured to implement the method described below after having established communication between them, and a memory 13A, 13B storing the code instructions for implementing this method, as well as the information relating to the position and the orientation of the camera installed on the respective vehicle with respect to the latter.

Figure 4:
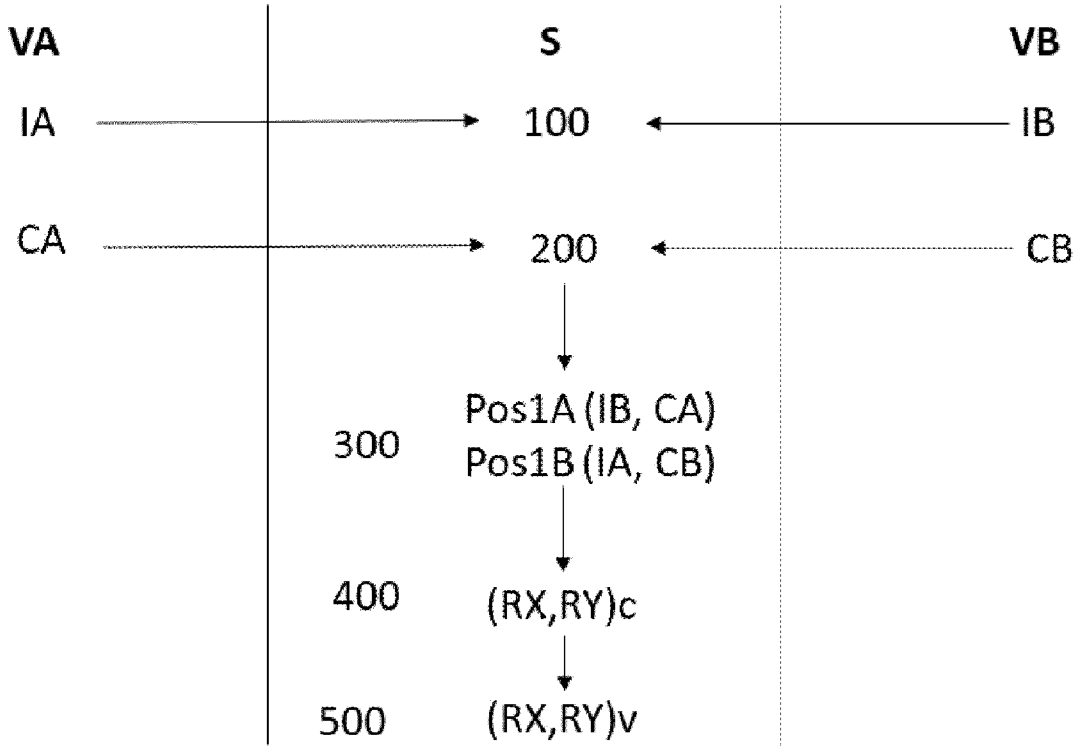
FIG. 4 schematically depicts the implementation of the method according to one embodiment.

In another embodiment illustrated schematically in FIG. 4, the vehicle VA and the reference object are adapted to communicate with a remote server S.

Figure 2:
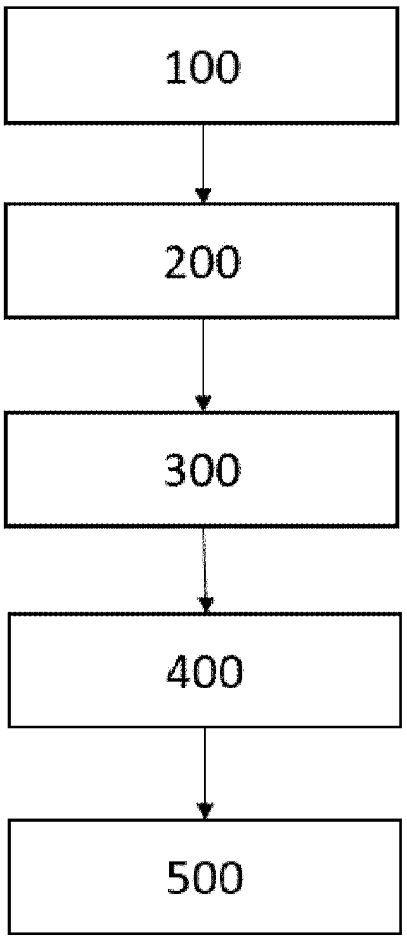
FIG. 2 schematically depicts the main steps of the method for determining the relative orientation between a vehicle and a reference object.
Figure 3:
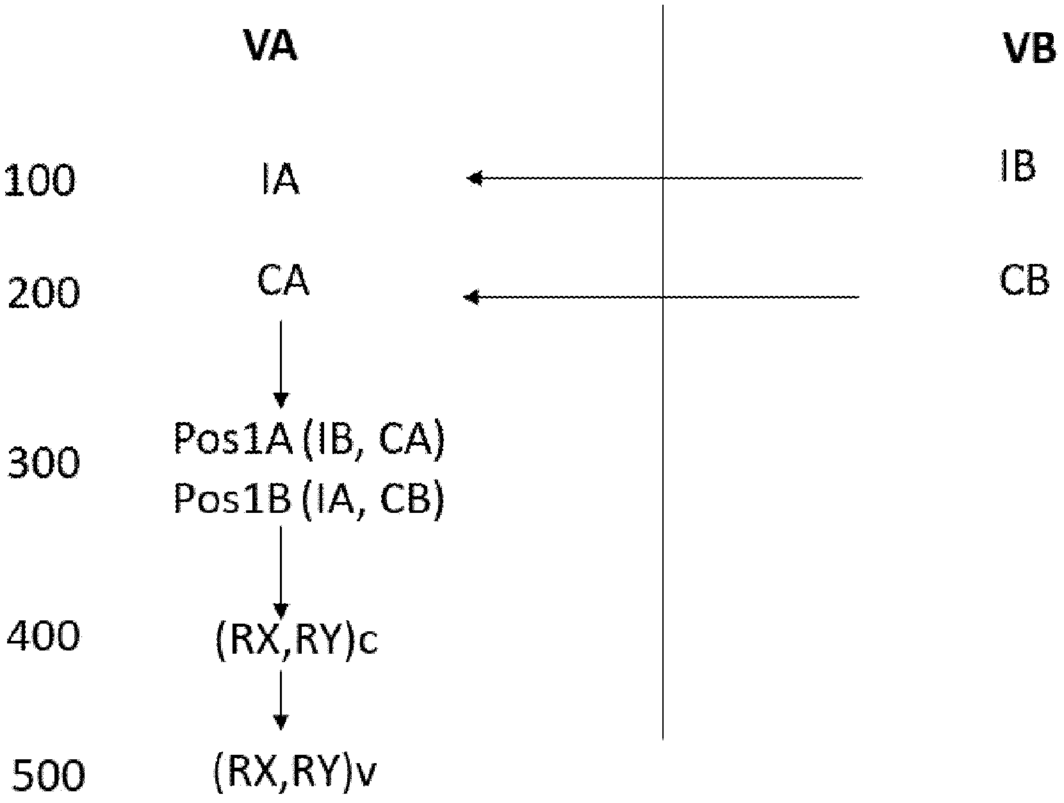
FIG. 3 schematically depicts the implementation of the method according to one embodiment.

With reference to FIGS. 2 to 4, examples of implementation of the method will now be described. In the description below, the reference object is a second vehicle VB. In the embodiment depicted in FIG. 3, the method is implemented by the computer of one of the vehicles, by convention, below, of the first vehicle VA. In the embodiment depicted in FIG. 4, the method is implemented by a remote server S.

The method comprises a first step 100 of receiving at least one image acquired by the image sensor of the first vehicle VA, in which the other vehicle or reference object is visible. Below, the example is taken where the first vehicle VA acquires an image IA where the second vehicle VB is visible. In the case where the method is implemented by the computer 12A of the first vehicle, the computer is connected to the camera and receives the images which it acquires. This step also comprises receiving an image IB acquired by the camera 11B of the second vehicle (or of the reference object), in which the first vehicle VA is visible. In the case where the method is implemented by a computer on board the first vehicle, the latter receives the image IB of the first vehicle via a wireless network. In the case where the method is implemented by a remote server (FIG. 4), the remote server may receive the images IA, IB acquired by the cameras of the two vehicles via the telecommunications network.

The method then comprises the computer implementing the processing receiving 200 information on the position of the image sensor 10B of the reference object, with respect to the latter, that is to say, in the preceding example, information denoted CB on the position of the image sensor 10B of the second vehicle VB with respect to the latter. This information may, for example, comprise a simplified three-dimensional representation of the reference object, as well as the position of the reference element in a reference frame associated with this simplified representation. This step also comprises receiving information on the position of the image sensor 10A of the first vehicle VA with respect to the latter. If the method is implemented by the computer of the first vehicle, this information is retrieved from the memory 13A.

In the embodiment in which a remote server S implements the processing and receives images acquired by the two vehicles, this step comprises the server receiving the information (CA and CB) on the position of each camera (10A and 10B) with respect to the vehicle (VA and VB) on which it is installed, respectively.

Based on the received information, the computer can estimate 300:

the position Pos1B, in the image IA acquired by the first vehicle VA, of the image sensor 10B of the reference object in the image, that is to say, for example, the position of the image sensor 10B of the second vehicle VB in the image, and the position Pos1A, in the image acquired by the reference object, of the image sensor 10A of the vehicle VA in the image, that is to say, for example, the position of the image sensor 10A of the first vehicle VA in the image acquired by the second vehicle VB.

To this end, in order to estimate a position, the computer implements an algorithm for detecting the outlines of the reference object or of the vehicle in the image. Numerous algorithms known to a person skilled in the art are available for fulfilling this function; for example, the publication by J. Redmon, S. Divvala, R. Girshick and A. Farhadi "You Only Look Once: Unified, Real-Time Object Detection", 2015, incorporated herein by reference, is known. Then the computer deduces, based on the relative position of the image sensor with respect to the reference object or to the vehicle, an estimated first position of the image sensor in the image. If the position of the image sensor with respect to either the first or second vehicle is not known, it is possible to consider that this sensor is part of the vehicle and deduce therefrom a range of possible values for the X and Y position of this sensor in the image.

The computer can then determine, step 400, the relative orientation between the two image sensors, denoted (RX, RY), so that:

a computed second position Pos2B of the image sensor 10B of the reference object in the image IA acquired by the first vehicle VA based on this relative orientation corresponds to the first position Pos1B estimated in the preceding step, and a computed second position Pos2A of the image sensor 10A of the vehicle VA in the image IB acquired by the image sensor 10B of the reference object based on this relative orientation corresponds to the estimated first position Pos1A of the image sensor 10A of the vehicle VA.

Figure 5:
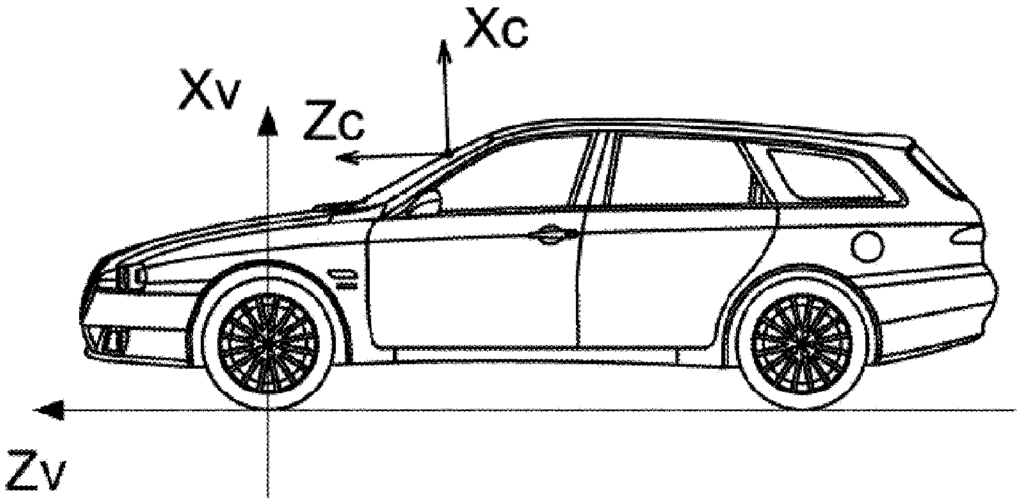
FIG. 5 depicts one example of a vehicle comprising an on-board camera and illustrates the reference frames associated with the vehicle and with the camera, respectively.
Figure 5:
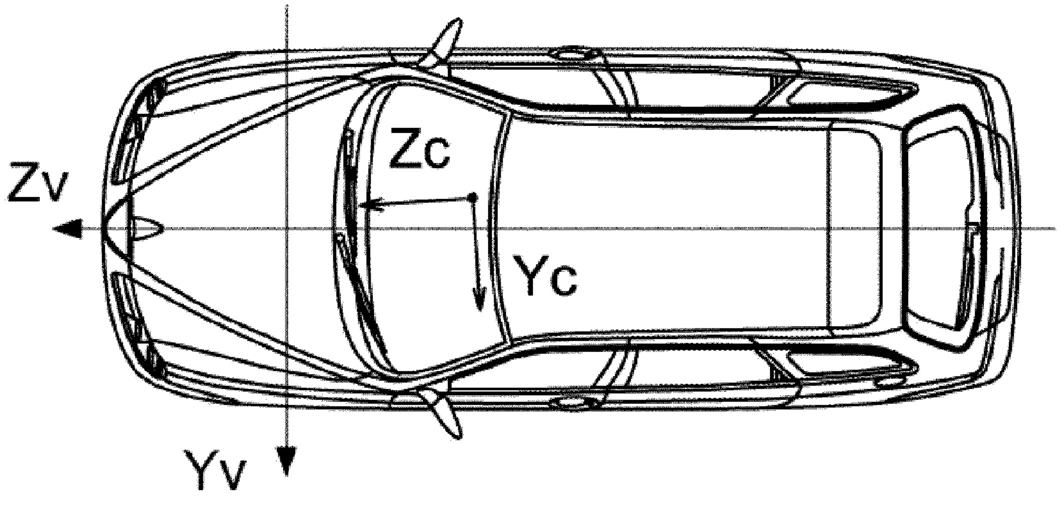

The relative orientation which is computed in the step 400 comprises the yaw angle RX and pitch angle RY between the image sensor and the reference element, that is to say a rotation with respect to an X axis depicted in FIG. 5 orthogonal to the plane of the road on which the vehicle is traveling, and a rotation with respect to a Y axis also depicted, which is orthogonal to the X axis and orthogonal to the direction of movement Z of the vehicle. The determined orientation does not comprise the roll along the Z axis. In the implementation of the step 400 described below, the relative position along the X and Y axes between the image sensor and the reference element is also determined.

The relative orientation between the two image sensors is determined by an iterative algorithm aiming to minimize a cost function formed by the differences between the computed second position of each image sensor based on the relative orientation between the image sensors, and the respective estimated first position.

In the reference frame of each image sensor, the position of that sensor is at the origin of the reference frame.

The computer can initialize the search for the relative orientation between the image sensors 10A, 10B with an initial relative orientation, for example equal to ($\varpi$, 0, 0, 0) where the first coordinate corresponds to a yaw angle ($\varpi$ is taken as the initial value in the example of two vehicles each comprising an image sensor since, in principle, the image sensors of the two vehicles are oriented in opposite directions to take images in which the two vehicles are visible), the second coordinate corresponds to a pitch angle, the third coordinate corresponds to a translation along the X axis and the fourth coordinate corresponds to a translation along the Y axis, these translations being known to within the scale factor and the Z translation being fixed at the value 1. Based on this initial relative orientation, the computer determines the position of the image sensor 10B of the reference object in a reference frame associated with the image sensor 10A of the vehicle VA, by applying a reference frame transformation matrix determined based on this initial orientation, then projects this position, based on the intrinsic parameters of the image sensor 10A of the vehicle VA, to obtain the coordinates of the image sensor 10B in an image acquired by the image sensor 10A. It thus obtains the computed second position Pos2B of the image sensor 10B of the reference object in the image IA. The same processing is implemented symmetrically to obtain the computed second position Pos2A of the image sensor of the vehicle VA in the image IB.

As indicated above, this computation is implemented iteratively so as to find the relative orientation matrix (RX, RY, TX, TY), with TX and TY being the translations along the X and Y axes, respectively, minimizing the difference between the computed position Pos2B and the estimated position Pos1B, and between the computed position Pos2A and the estimated position Pos1A. This can be done using a Levenberg-Marquardt algorithm, described in the publications:

K. Levenberg, "A Method for the Solution of Certain Problems in Least Squares", in Quart. Appl. Math. 2, 1944, pp. 164-168, incorporated herein by reference.

D. Marquardt, "An Algorithm for Least-Squares Estimation of Nonlinear Parameters", in SIAM J. Appl. Math. 11, 1963, pp. 431-441, incorporated herein by reference.

image sensor based on the relative orientation of the image sensors.

FIG. 5 depicts a reference frame (Xc, Yc, Zc) associated with an image sensor installed on a vehicle, and a reference frame (Xv, Yv, Zv) associated with the vehicle. With reference to FIG. 5, once the relative orientation of the image sensors has been obtained, the relative orientation between the two vehicles may easily be deduced during a step 500 based on the position and on the orientation of each image sensor with respect to the vehicle on which it is installed.

The invention claimed is:

1. A method for determining an orientation of a vehicle with respect to a reference object, the vehicle and the reference object each comprising an image sensor, the method being implemented by a computer and comprising:

receiving an image acquired by the image sensor of the vehicle, in which the reference object is visible, and an image acquired by the image sensor of the reference object, in which the vehicle is visible, receiving information on a position of the image sensor of the reference object with respect to the latter and information on a position of the image sensor of the vehicle with respect to the latter, based on the received information, determining i) an estimated first position of the image sensor of the reference object in the image acquired by the image sensor of the vehicle, and ii) an estimated first position of the image sensor of the vehicle in the image acquired by the image sensor of the reference object, determining a relative orientation between the two image sensors so that:

a second position of the image sensor of the reference object in the image acquired by the image sensor of the vehicle computed based on said relative orientation corresponds to the estimated first position of the image sensor of the reference object, and a second position of the image sensor of the vehicle in the image acquired by the image sensor of the reference object computed based on said relative orientation corresponds to the estimated first position of the image sensor of the vehicle, and deducing, based on the relative orientation between the two image sensors, the relative orientation between the vehicle and the reference object.

2. The method as claimed in claim 1, wherein the reference object is a pedestrian, another vehicle, or an infrastructure element.

3. The method as claimed in claim 1, wherein the computer is:

i) a computer on board the vehicle, or ii) a computer in the reference object, or iii) by a remote computer.

4. The method as claimed in claim 1, wherein the reference object is a second vehicle, wherein the computer is a computer on board the first and/or the second vehicle, and further comprising a preliminary step of establishing a communication link between the first vehicle and the second vehicle.

5. The method as claimed in claim 1, wherein the relative orientation between the two image sensors is determined by minimizing a difference between the estimated first position and a computed second position of the same image sensor.

6. The method as claimed in claim 1, wherein the relative orientation between the two image sensors is determined by the Levenberg-Marquardt algorithm.

7. The method as claimed in claim 1, wherein determining the relative orientation between the image sensors comprises determining a relative yaw and pitch between the image sensors, a roll being assumed to be zero.

8. A non-transitory computer program product comprising instructions for implementing the method as claimed in claim 1 when it is executed by a processor.

9. A vehicle comprising the image sensor, the computer, and an interface for connecting to a telecommunications network, wherein the computer is configured to implement the method as claimed in claim 1.

* * * * *